United States Patent [19]
Hey-Shipton et al.

[11] Patent Number: 5,856,768
[45] Date of Patent: Jan. 5, 1999

[54] TRANSITION AND INTERCONNECT STRUCTURE FOR A CRYOCABLE

[75] Inventors: Gregory L. Hey-Shipton; Wallace Y. Kunimoto; Michael J. Scharen, all of Santa Barbara; Stephan M. Rohlfing, Newbury Park; David J. Kapolnek, Santa Barbara, all of Calif.

[73] Assignee: Superconductor Technologies, Inc., Santa Barbara, Calif.

[21] Appl. No.: 638,321

[22] Filed: Apr. 26, 1996

Related U.S. Application Data

[63] Continuation of Ser. No. 227,924, Apr. 15, 1994, abandoned.

[51] Int. Cl.$^6$ ........................................................ H01P 1/04
[52] U.S. Cl. ........................ 333/99 S; 333/260; 505/210; 505/704; 505/706; 505/866
[58] Field of Search ..................... 333/260, 995; 505/210, 700, 701, 704, 706, 866

[56] References Cited

U.S. PATENT DOCUMENTS

| | | | |
|---|---|---|---|
| 3,263,193 | 7/1966 | Allen et al. | 505/866 X |
| 3,686,624 | 8/1972 | Napoli et al. | 333/238 X |
| 4,487,999 | 12/1984 | Baird et al. | 333/260 X |
| 4,724,409 | 2/1988 | Lehman | 333/260 |
| 4,737,601 | 4/1988 | Gartzke | 439/578 X |
| 5,120,705 | 6/1992 | Davidson et al. | 333/995 X |
| 5,508,666 | 4/1996 | Nguyen | 333/260 X |

FOREIGN PATENT DOCUMENTS

| | | |
|---|---|---|
| 26 09 076 | 9/1977 | Germany . |
| A1171244 | 7/1989 | Japan . |

*Primary Examiner*—Benny T. Lee
*Attorney, Agent, or Firm*—Lyon & Lyon LLP

[57] ABSTRACT

An electrical interconnect provides a path between cryogenic or cryocooled circuitry and ambient temperatures. As a system, a cryocable 10 is combined with a trough-line contact or transition 20. In the preferred embodiment, the cryocable 10 comprises a conductor 11 disposed adjacent an insulator 12 which is in turn disposed adjacent another conductor 13. The components are sized so as to balance heat load through the cryocable 10 with the insertion loss. In the most preferred embodiment, a coaxial cryocable 10 has a center conductor 11 surrounded by a dielectric 12 (e.g. Teflon™) surrounded by an outer conductor 13 which has a thickness between about 6 and 20 microns. The heat load is preferably less than one Watt, and most preferably less than one tenth of a Watt, with an insertion loss less than one decibel. In another aspect of the invention, a trough-line contact or transition 20 is provided in which the center conductor 11 is partially enveloped by dielectric 12 to form a relatively flat portion 28. The preferred overall geometry of the preferred embodiment of the cable is generally cylindrical, although other geometries are possible (e.g. stripline, microstrip, coplanar or slotline geometries).

28 Claims, 7 Drawing Sheets

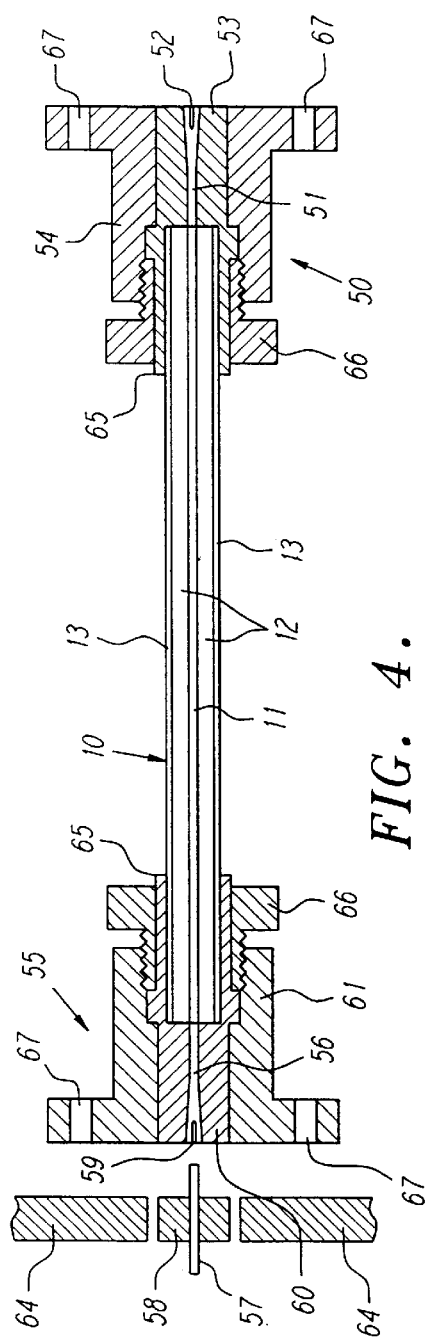
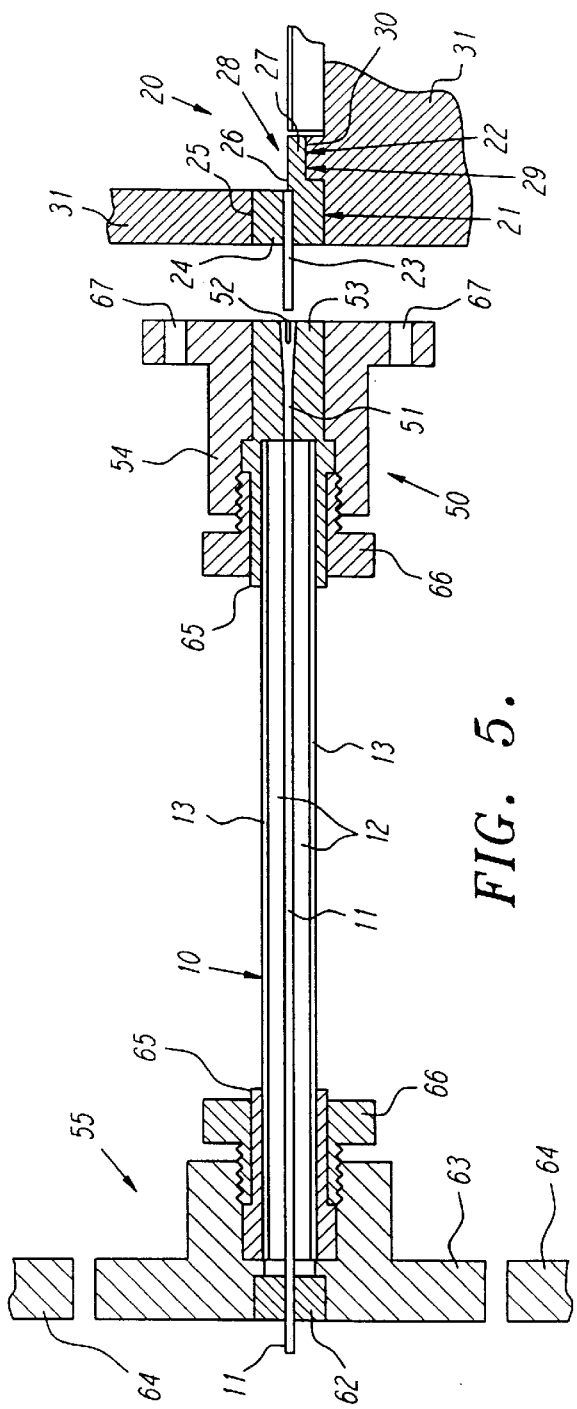
FIG. 4.
FIG. 5.

TRANSITION AND INTERCONNECT STRUCTURE FOR A CRYOCABLE

This is a continuation of application Ser. No. 08/227,974, filed on Apr. 15, 1994, now abandoned and which designated the U.S.

FIELD OF THE INVENTION

The present invention relates to signal interfaces, particularly coaxial cables and cable-to-circuit transitions (i.e. interconnects) which may preferably be used to interface cryogenic components and ambient-environment components which are at temperature differences of about 50–400K (or °C.). The invention is particularly useful in microwave or radio frequency applications of cold electronics or circuits which include high temperature superconductor material.

BACKGROUND

There are many benefits to having circuitry which includes superconductive material. Superconductivity refers to that state of metals and materials in which the electrical resistivity is zero when the specimen is cooled to a sufficiently low temperature. The temperature at which a specimen undergoes a transition from a state of normal electrical resistivity to a state of superconductivity is known as the critical temperature ("$T_c$"). The use of superconductive material in circuits is advantageous because of the elimination of resistive losses.

Until recently, attaining the $T_c$ of known superconducting materials required the use of liquid helium and expensive cooling equipment. However, in 1986 a superconducting material having a $T_c$ of 30K was announced. See, e.g., Bednorz and Muller, Possible High Tc Superconductivity in the Ba-La-Cu-O System, Z.Phys. B-Condensed Matter 64, 189–193 (1986). Since that announcement superconducting materials having higher critical temperatures have been discovered. Collectively these are referred to as high temperature superconductors (HTSs). Currently, superconducting materials having critical temperatures in excess of the boiling point of liquid nitrogen, 77K (i.e. about –196° C. or –321° F.) at atmospheric pressure, have been disclosed.

HTSs have been prepared in a number of forms. The earliest forms were preparation of bulk materials, which were sufficient to determine the existence of the superconducting state and phases. More recently, thin films on various substrates have been prepared which have proved to be useful for making practical superconducting devices. More particularly, the applicant's assignee has successfully produced thin film thallium superconductors which are epitaxial to the substrate. See, e.g., Olson, et al., Preparation of Superconducting TlCaBaCu Thin Films by Chemical Deposition, Appl. Phys. Lett. 55, No. 2, 189–190 (1989), incorporated herein by reference. Techniques for fabricating and improving thin film thallium superconductors are described in the following patent and copending applications: Olson, et al., U.S. Pat. No. 5,071,830, issued Dec. 10, 1991; Controlled Thallous Oxide Evaporation for Thallium Superconductor Films and Reactor Design, Ser. No. 516,078, filed Apr. 27, 1990; In Situ Growth of Superconducting Films, Ser. No. 598,134, filed Oct. 16, 1990; and Passivation Coating for Superconducting Thin Film Device, Ser. No. 697,660, filed May 8, 1991, all incorporated herein by reference.

High temperature superconducting films are now routinely manufactured with surface resistances significantly below 500 $\mu\Omega$ measured at 10 GHz and 77K. These films may be formed into circuits. Such superconducting films when formed as resonant circuits have an extremely high quality factor ("Q"). The Q of a device is a measure of its lossiness or power dissipation. In theory, a device with zero resistance (i.e. a lossless device) would have a Q of infinity. Superconducting devices manufactured and sold by applicant's assignee routinely achieve a Q in excess of 15,000. This is high in comparison to a Q of several hundred for the best known non-superconducting conductors having similar structure and operating under similar conditions.

A benefit of circuits including superconductive materials is that relatively long circuits may be fabricated without introducing significant loss. For example, an inductor coil of a detector circuit made from superconducting material can include more turns than a similar coil made of non-superconducting material without experiencing a significant increase in loss as would the non-superconducting coil. Therefore, a superconducting coil has increased signal pickup and is much more sensitive than a non-superconducting coil.

Another benefit of superconducting thin films is that resonators formed from such films have the desirable property of having very high energy storage in a relatively small physical space. Such superconducting resonators are compact and lightweight.

Although circuits made from HTSs enjoy increased signal-to-noise ratios and Q values, such circuits must be cooled to below $T_c$ temperatures (e.g. typically to 77K or lower). In addition, it is desirable to directly interface or connect these cooled HTS circuits to other components or devices which might not be cooled. Most particularly, the signals from the cooled circuits often must be coupled to electronics at ambient temperatures.

Furthermore, low temperatures must be maintained when using cryo-cooled electronics and infra-red detectors. In such situations an interface to couple signals between cooled and ambient temperatures is needed.

Generally, coaxial cables are used as signal interfaces. Coaxial cables are typically made of a central signal conductor (i.e. a center or inner conductor) covered with an insulating material (e.g. dielectric) which, in turn, is covered by an outer conductor. The entire assembly is usually covered with a jacket. Such a cable is "coaxial" because it includes two axial conductors which are separated by a dielectric core.

Although coaxial cables are generally used as signal interfaces, when connecting circuits which include HTS material one end of the connecting coaxial cable might be in contact with a circuit cooled to 77K and the other end might be in contact with a device at a much higher temperature (e.g. room ambient temperature is about 300K). Standard coaxial cables are not manufactured to operate under such conditions. When standard coaxial cables are used under such conditions, the signal losses may be quite high and the heat load by thermal conduction through the cable may be quite large.

Minimizing signal losses is important because the ability to transmit signals directly affects the sensitivity and accuracy of the devices. Insertion loss is a measure of such losses due to intermediary components. In equation form, if the output wattage of a circuit is $P_1$ without intermediary components and $P_2$ with intermediary components respectively, then the insertion loss L is given by the formula $$L(dB) = 10 \log_{10}(P_1/P_2)$$

Unless such losses are minimized, the benefits of using HTS or cryo-cooled materials may be lost.

Minimizing heat load is important because cryogenic coolers used to cool the HTS circuits generally have limited cooling capacity and are relatively inefficient. For example, the best cryocoolers currently available require the supply of approximately forty watts of power to a compressor to remove or lift approximately one watt of heat load. Therefore, it is preferable to limit heat load to 0.1 Watts or less.

Although minimizing heat load is important, it is also difficult. Standard coaxial cables are fabricated by extruding or swaging metal tubing (e.g. copper, gold, aluminum, stainless steel, or silver) over a dielectric (e.g. low-loss plastic materials, polyethylene materials, or Teflon™). The thinnest extruded tubing of which applicant is presently aware is about 0.005 inches (about 0.127 mm) thick.

In addition, as described above, one of the advantages of using HTS materials in circuits for microwave systems is the elimination of resistive losses. However, the advantage of reduced resistive loss can only be fully exploited if reflection or return losses (i.e. losses due to mismatches in characteristic impedances of the components) are minimized. This is especially true for components to be used at high frequencies (e.g. mm wave).

A primary candidate for mismatch problems in circuits including HTS materials is the transition through which a coaxial cable is connected to the circuit. In general, HTS material and circuits containing same have optimal properties in a planar configuration. However, coaxial cable is cylindrically shielded. The transition between the planar circuit and the cylindrical cable may contribute significant reflection or return losses.

The circuit bonding process may also affect the geometry of the transition between the circuit and cable. Typical cables require a transition through which the cable may be attached or bonded to a circuit. Typical coaxial cable transitions use the inner conductor of the cable suspended in air (e.g. forming a pin) where the air acts as a dielectric. The suspended conductor may be inadvertently slightly bent during a typical bonding process. The geometry of the transition may suffer from unsatisfactory reproducibility problems because of the mechanical stability (or instability) of the pin. A further disadvantage occurs when the contact is wrapped around the inner conductor pin, unnecessarily increasing inductance.

In addition, the geometry of the transition between the circuit and cable will directly affect the ease of assembly of the device using such components. To maximize ease of assembly the packaging of HTS circuits which are cooled to cryogenic temperatures must include special input and output leads. As explained above, HTS circuits must be cooled to below $T_c$. Generally, such cooling is achieved by holding the circuits in contact with the cold head of a cryocooler (e.g. enclosed in a vacuum dewar). To connect cooled circuits contained in a dewar interconnection points must be provided through a wall in the dewar. Such interconnections provide large thermal conduction paths for already inefficient cryocoolers.

The prior art has failed to provide a signal interface (including a transmission cable and cable-to-circuit transition) between cryogenic components and ambient environment components for use in radio frequency applications of cold electronics and high temperature superconductors. The prior art has also failed to provide an interface and transmission cable which exhibit low thermal conduction and low electrical losses (e.g. impedance continuity and low reflection losses), and which work over a frequency range including UHF, microwave, and low millimeter-wave frequencies (e.g. up to 40 GHz). The prior art has further failed to provide such an interface which is also mechanically stable (and, therefore, reproducible) and relatively easy to use.

SUMMARY OF THE INVENTION

The present invention comprises a signal interface (including a transmission cable and a cable-to-circuit transition) for connecting cryogenic components and ambient-environment components which are to be used in radio frequency applications of cold electronics and high temperature superconductors. In the preferred embodiment, the transmission cable of the present invention comprises an inner conductor positioned within a dielectric which has a thin outer conductor plated on its outer surface. The preferred embodiment of the cable-to-circuit transition of the present invention is also generally cylindrical and comprises an inner conductor positioned within a dielectric which has a thin outer conductor plated on its outer surface. In addition, the transition also preferably includes a semi-circular end area which provides a flat surface at least for ease of bonding the transition to a cryo-cooled circuit and for impedance matching purposes. Preferably, the components are sized so as to balance heat load through the transmission cable and transition with the insertion loss.

As is mentioned above, outer conductors for coaxial cables are generally fabricated by extruding or swaging metal tubing over a dielectric. As is also mentioned above, the thinnest extruded tubing of which applicant is presently aware is about 0.005 inches (about 0.127 mm) thick. Such extruded tubing experiences higher heat conduction than would a thinner metal tubing. For example, tubing having a thickness of 0.005 inches (about 0.127 mm) experiences a heat load which is eight times the thermal conduction of a similar tubing having a thickness of about 0.0008 inches (about 20 $\mu$) and twenty times the thermal conduction of a similar tubing having a thickness of about 0.00024 inches (about 6 $\mu$).

In the most preferred embodiment, the transmission cable of the present invention comprises a coaxial cryocable having a center conductor surrounded by a dielectric (e.g. Teflon™) surrounded by an outer conductor which has a thickness between about 6 and 20 microns.

The heat load is preferably less than one Watt, and most preferably less than one tenth of a Watt, with an insertion loss less than one decibel. The preferred overall geometry of the preferred embodiment of the cable is generally cylindrical, although other geometries are possible (e.g. stripline, microstrip, coplanar or slotline geometries).

The present signal interface (i.e. cable and transition) exhibits low thermal conduction, low electrical losses (e.g. impedance continuity and low reflection losses), and works over a frequency range including UHF, microwave, and low millimeter-wave frequencies (e.g. up to 40 GHz). The present signal interface also is mechanically stable, reproducible, and relatively easy to use.

It is a principal object of the present invention to provide an improved signal interface.

It is also an object of the present invention to provide a signal interface which exhibits desirable electrical properties (e.g. low electrical reflection, and power losses, and impedance continuity).

It is an additional object of the present invention to provide a signal interface which is mechanically stable and readily reproducible.

It is a further object of the present invention to provide a signal interface which is easy to assemble.

It is another object of the present invention to provide a signal interface for connecting cryogenic components and ambient-environment components which are to be used in radio frequency applications of cold electronics and high temperature superconductors.

It is also the object of the present invention to select appropriate materials, thereby providing very low outgassing materials which allows the vacuum integrity to be preserved for several years.

It is also an object of the present invention to provide an hermetic feedthrough from the vacuum side of a dewar to the warm side of the dewar, which also allows for the vacuum integrity to be preserved for several years.

It is also an object of the present invention to provide a clean cryocable with no entrapped contaminants that will compromise the vacuum integrity.

It is also an object of the present invention to provide a signal interface which exhibits low thermal conduction.

It is yet another object of the present invention to provide a signal interface which exhibits low electrical losses, impedance continuity and low reflection losses.

It is still another object of the present invention to provide a signal interface which works over a frequency range including UHF, microwave, and low millimeterwave frequencies (e.g. up to 40 GHz).

It is a further object of the present invention to provide a signal interface which includes a coaxial cryocable having a central conductor surrounded by a dielectric having an outer conductor plated on its surface.

It is also a further object of the present invention to provide a signal interface which includes a cable-to-circuit transition having a coaxial connecting end to which a coaxial cable may be attached and a flat bonding surface end to which a circuit may be bonded.

Other objects and features of the present invention will become apparent from consideration of the following description taken in conjunction with the accompanying drawings.

BRIEF DESCRIPTION OF THE DRAWINGS

FIG. 4 is a cross-sectional view of an embodiment of the coaxial cryocable of the present invention having connectors on each end and of a preferred embodiment of the glass feed through of the present invention.

FIG. 5 is a cross-sectional view of an embodiment of the coaxial cryocable of the present invention having a similar connector to those shown in FIG. 4 on one end and of an embodiment of the trough line of the present invention that mates to this connector. On the other end of the cable is a fired-in glass feedthrough through which a continuous center conductor passes that continues all the way to the connector that mates with the trough line interface.

DETAILED DESCRIPTION OF THE PREFERRED EMBODIMENTS

As shown in FIG. 5, the preferred signal interface of the present invention comprises a cryocable 10 and a cryocable transition 20. Like reference labels appearing in the figures refer to the same elements from figure to figure and may not be explicitly described for all of the figures. The transition 20 is preferably both co-planar and coaxial. The transition 20 may be used to transition circuitry to the cryocable 10 of the present invention or other coaxial cables as are known in the art.

Figure 1:
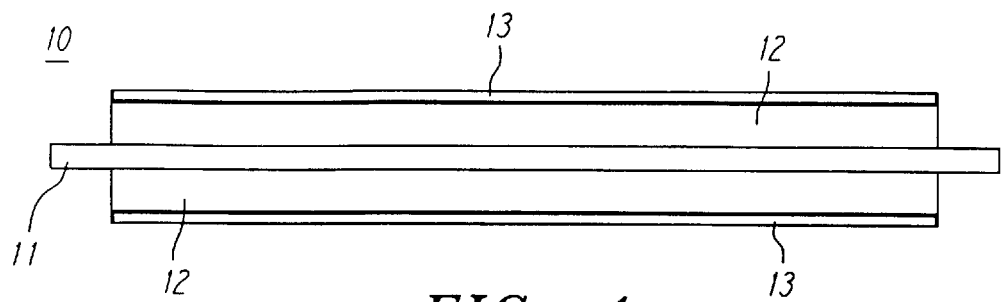
FIG. 1 is a cross-sectional view of a preferred embodiment of the cryocable of the present invention.

The present invention provides a coaxial cryocable 10 which may be used to connect devices held at widely differing temperatures (e.g. up to temperature differences of about 50 to 400K (°C.) (i.e. temperature differences of about 90° to 720° F.)) while minimizing signal losses and thermal conduction. As shown in FIG. 1, the present invention provides a coaxial cryocable 10 comprising an inner conductor 11. The inner conductor 11 is a wire, preferably solid, of very low thermal conductivity which is preferably copper, gold, or silver plated by electroplating to a thickness which can easily be controlled and/or varied to match the operating frequency of the system.

The cryocable 10 also comprises a dielectric 12 which is preferably made of Teflon™ or other dielectrics which are well known in the art. The dielectric constant of Teflon™ is substantially constant from about 800 MHz through 40 GHz. The dielectric 12 is preferably an extruded tubing such as is available from Zeus Industrial Products, Inc., 501 Boulevard St., Orangeburg, S.C. 29115, U.S.A. The inner conductor 11 should fit inside the dielectric tube 12.

The cryocable 10 further comprises an outer conductor 13. The outer conductor 13 is preferably a copper, gold, or silver layer which is preferably formed by electroplating the outer surface of the dielectric tube 12 with the desired metal. The thickness of the outer conductor 13 may be accurately controlled by the electroplating process. Electroplating the dielectric may be accomplished by plating firms such as Polyflon Company, 35 River St., New Rochelle, N.Y. 10801, U.S.A.

In determining optimal dimensions of the inner conductor 11, the dielectric 12, and the outer conductor 13 the following must be considered: (1) the heat load provided by various thicknesses of outer conductor 13 and various diameters of inner conductor 11 (FIG. 2); and (2) the attenuation experienced by various diameters of inner conductor 11 at various operating frequencies (FIG. 3).

Figure 2:
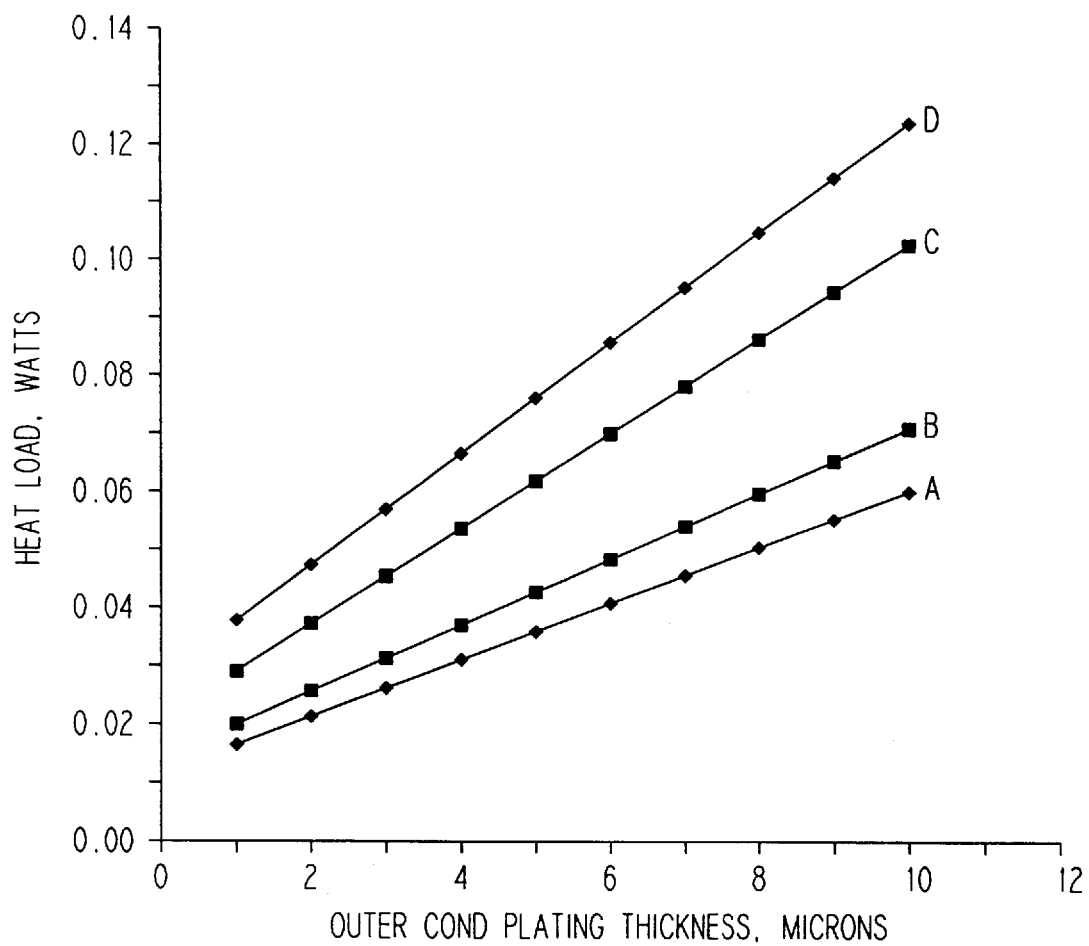
FIG. 2 is a plot of heat load in Watts versus outer conductor upper plating thickness in microns for coaxial cables with various outer diameters.
Figure 3:
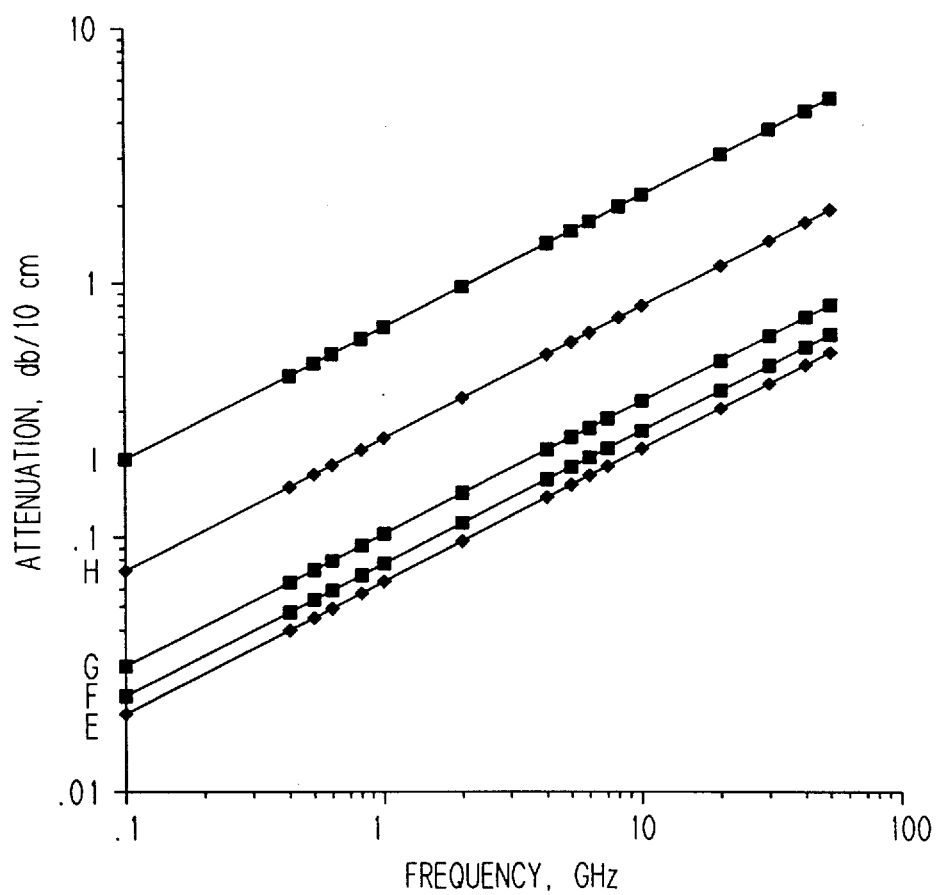
FIG. 3 is a plot of attenuation in decibels per 10 centimeter length versus frequency in gigahertz for coaxial cables with various outer diameters.

FIG. 2 shows the heat load provided by outer conductors having various diameters when the inner conductor has various diameters and when the cryocable is 5 cm long. Table 1 shows the dimensions and materials used for the cryocables from which the information for FIG. 2 was generated.

TABLE 1

| | INNER CONDUCTOR | | OUTER CONDUCTOR | |
|---|---|---|---|---|
| LINE | DIAMETER | MATERIAL | DIAMETER | MATERIAL |
| A | 0.010" | COPPER* | 0.0335" | COPPER |
| B | 0.012" | COPPER* | 0.040" | COPPER |
| C | 0.017" | COPPER* | 0.057" | COPPER |
| D | 0.020" | COPPER* | 0.067" | COPPER |

*Copper plated CRES

As explained above, it is preferable to keep the heat load below 0.10 Watts. Therefore, an extrapolation of line A of FIG. 2 indicates that a cryocable 10 having an inner conductor 11 about 0.010 inches thick, should have an outer conductor 13 which is preferably no more than about 20 microns thick to keep the heat load to no more than about 0.10 Watts. As indicated by line D of FIG. 2 the maximum thickness for the outer conductor 13 of a cryocable 10 having an inner conductor 11 about 0.020 inches thick for a heat load of 0.1 Watt is preferably no more than about 7.5 microns thick.

FIG. 3 shows the attenuation or insertion loss experienced by various cryocables operating at various operating frequencies. Table 2 shows the dimensions and materials used for the cryocables which were tested for FIG. 3. In all examples the copper plating is about 6 microns thick (i.e. 3 skin depths).

TABLE 2

| | INNER CONDUCTOR | | OUTER CONDUCTOR | |
|---|---|---|---|---|
| LINE | DIAMETER | MATERIAL | DIAMETER | MATERIAL |
| E | 0.020" | COPPER | 0.067" | COPPER |
| F | 0.0.17" | COPPER | 0.057" | COPPER |
| G | 0.012" | COPPER | 0.040" | COPPER |
| H | 0.012" | COPPER | 0.040" | CRES |
| I | 0.0045" | SPCW | 0.015" | CRES |

FIG. 3 shows that as the conductors of the cryocables et smaller and smaller the attenuation gets larger and larger. Therefore, although smaller conductors are preferred to minimize heat load (see FIG. 2), smaller conductors may also lead to unacceptably high insertion losses.

For microwave and radio frequency operations of cold electronics or circuits which include high temperature superconductor material a preferred operating frequency range is up to about 40 GHz. In addition, for such applications it is preferable that the attenuation amount to no more than about 0.7 dB for a 10 cm length of cryocable. Cryocables represented by lines E, F, and G, in FIG. 3, have no more than 0.7 dB attenuation when operating at 40 GHz. As explained above, the smaller cryocables have smaller thermal conduction. Therefore, the preferred cryocable is the smaller cryocable such as that represented by line G.

In addition, the ratio of the outer diameter of the inner conductor 11 (i.e. the inner diameter, ID, of the dielectric 12) and the inner diameter of the outer conductor 13 (i.e. the outer diameter, OD, of the dielectric) is relatively fixed, by formula, depending on the range of operating frequencies of the cryocable 10, the impedance of the cryocable 10, and on the dielectric constant of the dielectric 12. For example, for an impedance of 50 Ω, the ratio of OD to ID is approximately 3.35. The desired ratio is easily calculated by those skilled in the art according to the known formula:

$$Z_0 = (138/\sqrt{E_r}) \log_{10}(OD/ID)$$

wherein $Z_0$ is the characteristic impedance of the coaxial cable and $E_r$ is the dielectric constant. Furthermore, the sum of the ID and OD relate to the maximum voltage of operation. For example, if the sum of an ID and OD amounts to 0.12 inches, the signal will start deteriorating at about 40 GHz.

Taking into consideration all of the above, the features of the cryocable 10 of the present invention having the following dimensions. The inner conductor 11 preferably has a diameter of about 0.012 inches (i.e. 0.30 mm), and the plating on the inner conductor 11 is preferably no thicker than 20 microns. The dielectric tubing 12 preferably has an inner diameter of about 0.012 inches (i.e. 0.30 mm) and an outer diameter of about 0.040 inches (1.02 mm). To reduce thermal conductivity, the outer conductor 13 is preferably on the order of between about twenty and about six microns thick. This thickness should allow for at least a few skin depths. For example, if the plating is copper, it is preferably at least about 0.00024 inches (i.e. 6 μ) which is about three skin depths thick at 1 GHz.

The coaxial cryocable 10 comprising the structure and materials described above is semirigid and can be bent slightly to facilitate connecting the cryocable 10 to components. In addition, a service loop may be provided to allow for thermal contraction of the cryocable 10 when it is cooled from a room ambient temperature of about 300K (i.e. about 27° C. or 80° F.) to a cryogenic temperature of 77K (i.e. about −196° C. or −321° F.).

As is explained above, a typical coaxial cable requires a transition and a typical transition comprises an inner conductor suspended in air (e.g. forming a pin) where the air acts as a dielectric for the inner conductor. As is also explained above, wire bonding reproducibility may be affected where the suspended conductor is bent during the process of attaching or wire bonding the cable to a circuit. Mechanical stability of the pin is greatly increased if the dielectric material under the pin were solid, rather than air. Bonding to the pin is easier when the pin has a flat surface to which to bond. The present invention utilizes these structures.

As shown in FIGS. 4 and 5, it is preferred that the coaxial cryocable 10 of the present invention be connectable at each end. One end of the cryocable 10 should be connectable to cold electronics or circuits containing high temperature superconductors, preferably through the cable transition 20 of the present invention which is described below and shown in FIG. 5. The other end of the cryocable 10 should be connectable to ambient environment electronics, preferably through a connection which would maintain an hermetic vacuum seal so the cryocable 10 may be positioned within a dewar holding cooled components without providing a vacuum leak as is described below and shown in FIGS. 4 and 5.

Generally, as is explained above, circuits which must be held at cryogenic temperatures (e.g. 77K, −196° C., −321° F.) are placed in contact with a cold plate in a vacuum dewar or similar holding device. The cryocable 10 of the present invention must be connectable through the dewar to ambient environment while maintaining the vacuum within the dewar.

As shown in FIGS. 5-8, the present invention includes a cable transition 20 which has a cylindrical portion 21 and a semi-cylindrical portion 22. The cylindrical portion 21 includes a cylindrical inner conductor 23, a cylindrical solid dielectric 24, and an outer conductor 25 on the curved outer surface of the cylindrical dielectric 24.

Also shown in FIGS. 5–8, the semi-cylindrical portion 22 includes a semi-cylindrical inner conductor 26 and a semi-cylindrical solid dielectric 27. The semi-cylindrical inner conductor 26 and dielectric 27 form a flat exposed surface 28. The semi-cylindrical portion 22 includes a semi-cylindrical surface 29 and an outer conductor 30 preferably plated on the curved outer semi-cylindrical surface 29 of the semi-cylindrical dielectric 27. The outer conductors 25 and 30 provide metal surfaces which may be soldered to a metal circuit housing 31 as shown in FIG. 5. The dielectric 24 and 27 could be made of any suitable material and is preferably made from a hard plastic such as PEEK available from Victrex® of ICI Advanced Materials, 475 Creamery Way, Exton, Pa. 19341, U.S.A.

Because the outer conductor 30 is located only on the semi-cylindrical surface 29 of the dielectric 27, the outer conductor 30 does not completely shield the semi-cylindrical inner conductor 26 electrically. In addition, the overall dielectric constant of the dielectric surrounding the inner conductor 26 (solid dielectric 27 on one side and air on the other) will no longer be uniform. Therefore, the transition 20 will have an impedance which is a function of a dielectric constant which is somewhere between that of the two dielectrics around the inner conductor 26 (solid dielectric 27 and air).

Figure 6:
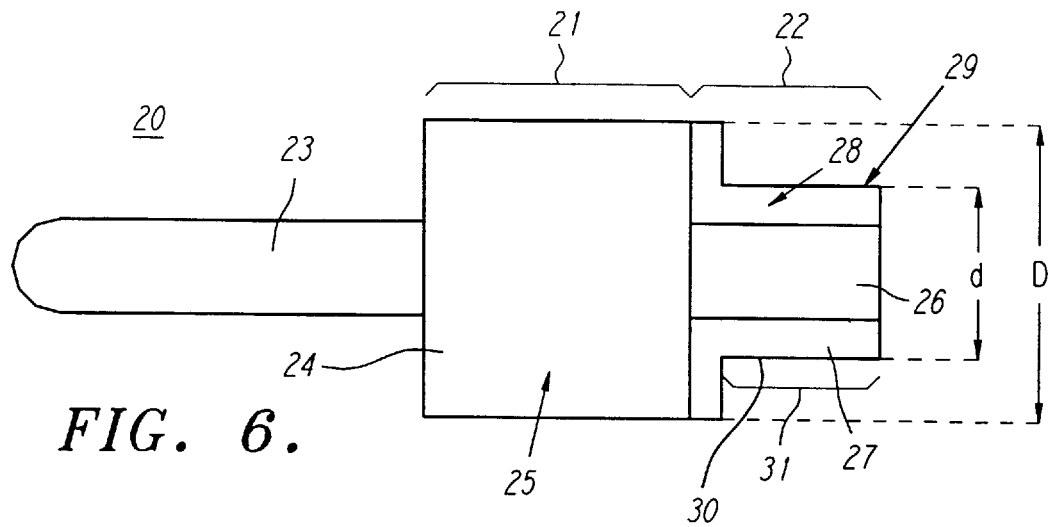
FIG. 6 is a top view of an embodiment of the trough line launch of the present invention.
Figure 7:
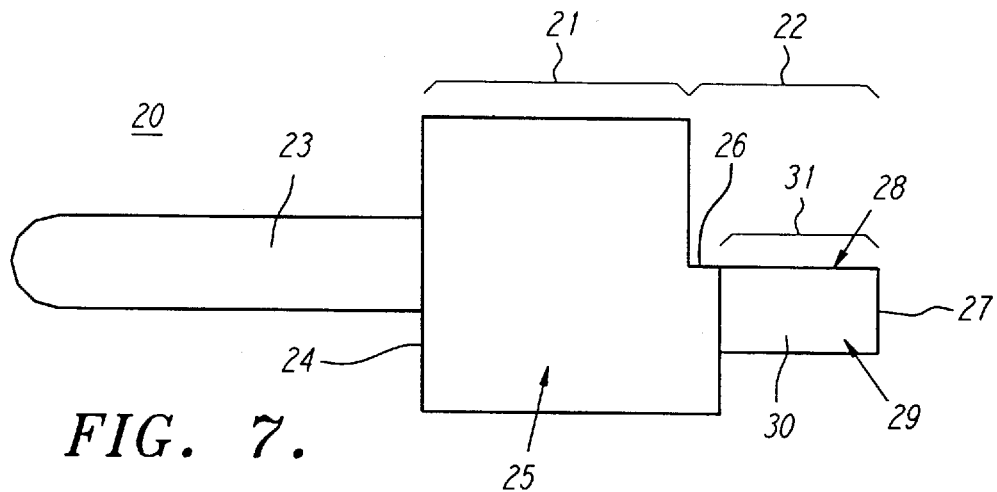
FIG. 7 is a side view of the trough line launch of FIG. 6.
Figure 8:
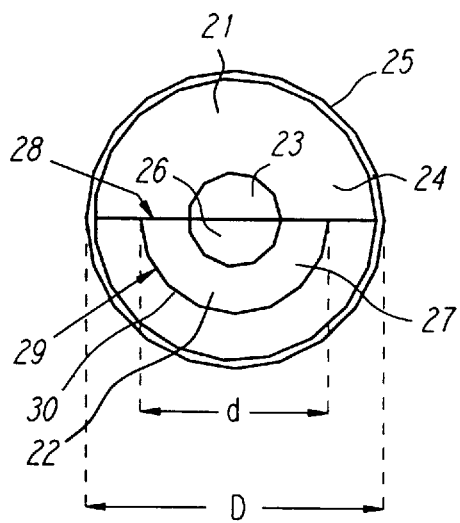
FIG. 8 is a front view of the trough line launch of FIG. 6.

Because air (with a dielectric constant of 1) is the dielectric for about one-half of the semi-cylinder inner conductor 26, the effective dielectric constant of the transition 20 will be lower at the semi-cylindrical portion 22 than it is at the full cylindrical portion 21. Therefore, it is preferable that the diameter d (shown in FIGS. 6 and 8) of the semi-cylindrical portion 22 be smaller than the diameter D (also shown in FIGS. 6 and 8) of the full cylindrical portion 21. The portion of the transition 20 which is semi-cylindrical will be referred to as the cable trough line or CTL 22, as is shown in FIGS. 6 and 7.

A small number of variables have been used to describe the transition 20 of the present invention for the purposes of devising a model. A simple model has been devised to find the impedance of each segment of the transition 20 so that dimensions could be determined for experimentation purposes. $D_1$, $D_2$, and $D_3$ respectively represent the diameters of the semi-cylindrical dielectric 27 at the cable trough line 22, the coaxial inner conductor 23, and the coaxial outer conductor 25. $E_r$ represents the dielectric constant of the solid dielectric 24 in the cylindrical portion 21 and the solid dielectric 27 in the stabilized half of the semi-cylindrical or cable trough line portion 22.

A number of dielectric materials have been considered for use as the solid dielectric 24 and 27. There are many good candidates. The solid dielectric 24 and 27 must bond to the inner conductor 23 and 26, and be suitable for production to small tolerances (possibly 0.001 inches or less (i.e. 0.025 mm or less)). The material is preferably grindable with conventional grinding equipment. Other requirements further narrow the list of possible dielectrics. These requirements include frequency of operation, the nature of the connection cable (and its impedance), vacuum compatibility, temperature exposures, and stability through thermal cycling. Although many materials may be used for the dielectric 24 (e.g. hard plastic such as PEEK), Table 3 below illustrates the output of the model using dense Teflon™ as the dielectric 24.

TABLE 3

| TROUGH/COAX LINE EVALUATION | |
|---|---|
| TROUGH COAX LINE OUTER DIA, $D_1$ | 0.0258" |
| COAX INNER DIA, $D_2$ | 0.0120" |
| COAX OUTER DIA, $D_3$ | 0.0402" |
| 1ST SECTION COAX REL DIEL CONST, $E_r$ | 2.100 |
| 1ST SECTION COAX LINE IMPEDANCE | 50.00 Ω |
| IMPEDANCE OF TROUGH LINE | 50.00 Ω |
| TOTAL CAP/UNIT L OF TROUGH LINE | 0.8959E −10 F/m |
| EFFECTIVE DIEL CONST OF TROUGH LINE | 1.806 |
| TROUGH LINE RELATIVE PHASE VELOCITY | 0.7442 |

Some of the benefits of using a material such as PEEK or Teflon™ as the dielectric include that these materials may be produced by injection molding or conventional machining and grinding of a solid piece. In addition, precise dimensions may be obtained. Thus, a transition 20 made with a PEEK or Teflon™ dielectric is easy and inexpensive to produce. The flat surface 28 of the cable trough line 22, shown in FIGS. 5–8, provides a bonding surface which may also be produced inexpensively and in large numbers despite its small size. Therefore, the preferable material for the dielectric 24 and 27 for the transition 20 is a material such as PEEK or Teflon™.

Figure 9:
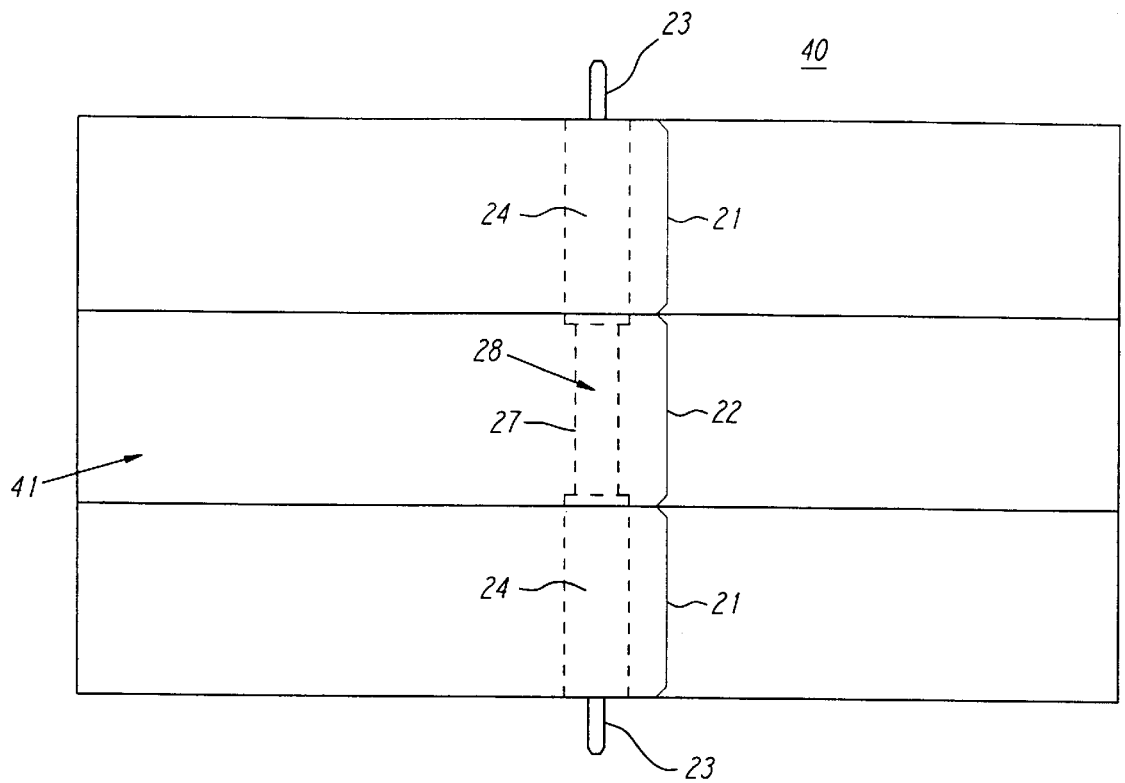
FIG. 9 is a top view of a fixture for determining the sensitivity of a coaxial line's impedance.
Figure 10:
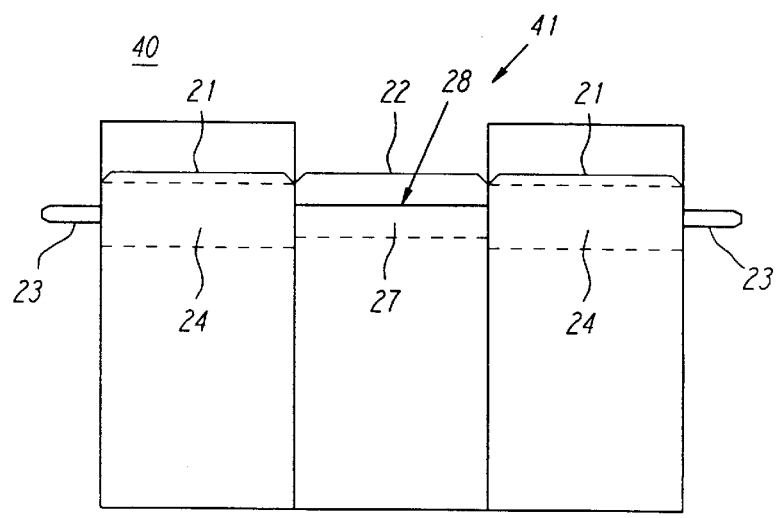
FIG. 10 is a side view of the fixture of FIG. 9.

The degree of precision necessary for the dimensions of the transition 20 must be determined for the particular material used for the dielectric 24 and 27, with consideration of the methods used for constructing the cable trough line 22. FIGS. 9 and 10 show a fixture 40 which may be used to determine the sensitivity of a coaxial line's impedance to the dimensions of the cable trough line 22. K-connectors™, which are well known in the art, may be used to interface the fixture 40 with test equipment. The return loss of the fixture 40 is monitored as a fixture-trough 41 (which is to become the cable trough line 22) is ground down. The depth of the fixture trough 41 will be monitored as the grinding progresses so that voltage standing wave ratio (VSWR) at a given frequency can be measured as a function of depth of the trough 41 and used to prove the design dimensions. The dimensions of the fixture 40 may be determined using information such as that in Table 3.

Once dimensional specifications are determined for the dielectric 24 and 27 and inner conductor 23 and 26, a method of manufacturing the transition 20 can be determined. For a solid dielectric material with a strong interface to the inner conductor 23 and 26 (such as sealing glass), a grinding process could be used once the dielectric 24 and 27 is attached to a housing. For a softer dielectric material, such as Teflon™ or PEEK, the dielectric 24 and 27 could be manufactured separate from the inner conductor 23 and 26 and used as a standard part for any variety of housings.

The transition 20 may be manufactured through a process similar to that described above for the cryocable 10. However, before the outer conductors 25 and 30 (shown in FIGS. 5–8) are plated on the cylindrical surfaces of the dielectric 24 and 27, the transition 20 is turned to form the portion with the smaller diameter d (also shown in FIGS. 5–8). After the portion having the smaller diameter d is formed, the outer conductors 25 and 30 may be plated on the exterior surfaces of the dielectric 24 and 27. After the plating is completed, the portion of the transition 20 with the smaller diameter d is then ground down or chopped to form the semi-cylindrical portion 22 and the flat surface 28 of the semi-cylindrical portion 22 (shown in FIGS. 5–8).

Figure 11:
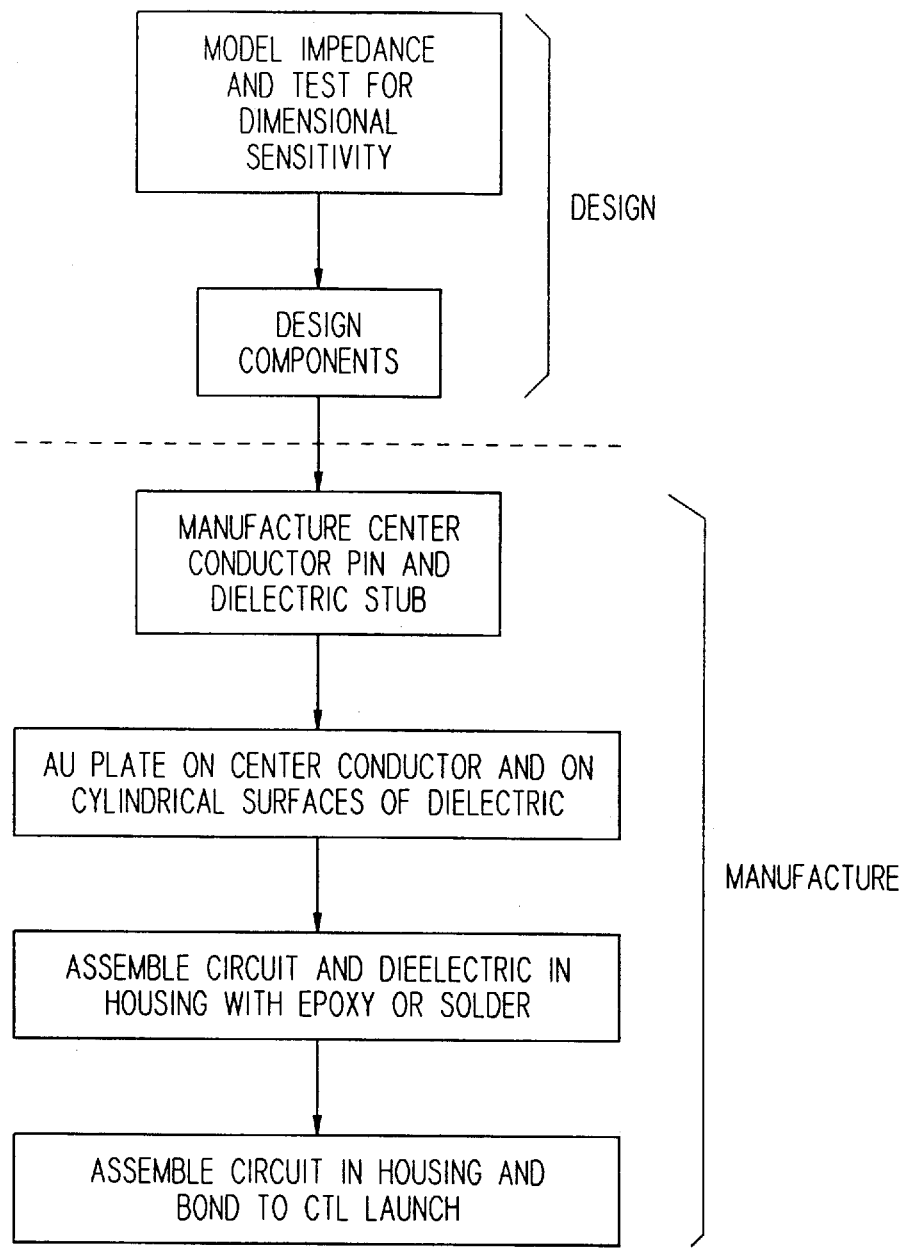
FIG. 11 is a chart showing an exemplary flow for the production and assembly of a trough line of the present invention.

FIG. 11 provides an exemplary flow chart for the production and assembly of a transition 20 including a cable trough line 22 using Teflon™ as the dielectric 24 and 27 material. First, as is described above, a model of the transition 20 should be tested for its impedance at various dimensions. Then, the particular components may be designed. Next, the inner conductor 23 and 26 and the dielectric 24 and 27 are manufactured. Then, the inner conductor 23 and 26 and the outer curved surfaces of the dielectric 24 and 27 are plated. Finally, the inner conductor 23 and 26 is positioned in the dielectric 24 and 27 and glued, bonded, epoxied, soldered or held by friction in place. The transition 20 is now ready to be assembled in a housing and bonded to a circuit as shown in FIG. 5.

Coaxial connectors enable the cryocable 10 to connect to the transition 20 and/or to electronics held at ambient temperatures. FIGS. 4 and 5 show an exemplary cold housing connector 50 which provides an appropriate coaxial connection between the cryocable 10 and the transition 20. The cold housing connector 50 includes an end receptacle or sleeve 51 which accepts both the inner conductor 11 from the cryocable 10 and the inner conductor 23 from the transition 20. The inner conductors 11 and 23 may be soldered together within the end receptacle 51. The end receptacle 51 may be provided with a spring finger contact 52 to provide a snug fit between the inner conductor 23 and the end receptacle 51.

As shown in FIGS. 4 and 5, axially surrounding the end receptacle 51 is a dielectric 53 and axially surrounding the dielectric 53 is a metal connector housing 54. The dielectric 53 must be sized to provide the cold housing connector 50 with the appropriate impedance (i.e. with an impedance which matches that of the cryocable 10 and the transition 20). One would expect that to provide the cold housing connector 50 with the appropriate impedance the dielectric 53 would be of a larger diameter than the dielectric 12 of the cryocable 10 due to the end receptacle 51 having a larger diameter than the inner conductor 11. The connector housing 54 is preferably made from metal and preferably acts as an outer conductor for the connector 50.

FIGS. 4 and 5 each show an embodiment of an exemplary warm housing connector 55 which may provide an appropriate coaxial connection between the cryocable 10 and electronics held at ambient temperatures. The warm housing connector 55 shown in FIG. 4 includes an end receptacle or sleeve 56 which accepts both the inner conductor 11 of the cryocable 10 and a feed through inner conductor 57. As is mentioned above, it is preferable that the connection between the cryocable 10 and ambient temperature electronics have a vacuum seal so, for example, the connection may extend through the wall of a vacuum dewar. The feed through inner conductor 57 shown in FIG. 4 is provided with a soldered in glass bead 58 surrounding the inner conductor 57 and thereby providing a vacuum seal. The glass bead 58 may then be attached to the wall of the dewar to provide a vacuum tight seal. The glass bead 58 has a metal outer coating to enable the glass bead 58 to be soldered into the dewar wall to thereby provide a vacuum tight seal. The inner conductors 11 and 57 may be soldered together within the end receptacle 56. The end receptacle 56 may be provided with a spring finger contact 59 (see FIG. 4) to provide a snug fit between the inner conductor 57 and the receptacle 56.

The warm housing connector 55 shown in FIG. 4 also includes a dielectric 60 axially surrounding the end receptacle 56 and a metal connector housing 61 axially surrounding the dielectric 60. As with the dielectric 53 of the cold housing connector 50 described above, the dielectric 60 of the warm housing connector 55 must be properly sized to provide the connector 55 with the appropriate inductance. As with the connector housing 54 of the cold housing connector 50 described above, the connector housing 61 of the warm housing connector 55 is preferably made from metal and is preferably gold plated so it acts as an outer conductor for the connector 55.

The warm housing connector 55 shown in FIG. 5 incorporates the inner conductor 11 of the cryocable 10 as a continuous inner conductor. The inner conductor 11 extends through a fired in glass bead 62. The fired in glass bead 62 provides a vacuum seal between the inner conductor 11 and a metal connector housing 63. The metal connector housing 63 may then be directly attached to the dewar housing 64 via, for example, electron beam or laser welded.

As shown in FIGS. 4 and 5, the cryocable 10 is preferably connected to the cold housing connector 50 and the warm housing connectors 55 via separate protective jacket 65 and a threaded collar 66 arrangements. The protective jackets 65 are preferably provided over a portion of the outer conductor 13 of the cryocable 10 which is to be covered by the threaded collars 66. The protective jackets 65 protect the thin outer conductor 13 from being damaged by the connection. The threaded collars 66 preferably fit over the protective jackets 65 and by pressure contact caused by the collar 66 threadedly screwing into the housing 54, connect the cryocable 10 to the cold housing connector 50 and the warm housing connector 55. The threaded collars 66 provide mechanical rigidity and electrical integrity to the cryocable 10 at the connections.

The cold housing connector 50 and the warm housing connectors 55 may be provided with bolt apertures 67 (shown in FIGS. 4 and 5) to enable the cold housing connector 50 to be bolted to the circuit housing 31 and the dewar housing 64 respectively. However, as is explained above, the warm housing connector 55 shown in FIG. 5 may be directly connected to the dewar housing 64 by means other than bolting (i.e. by soldering, gluing, electron beam welding or laser welding).

Figure 12:
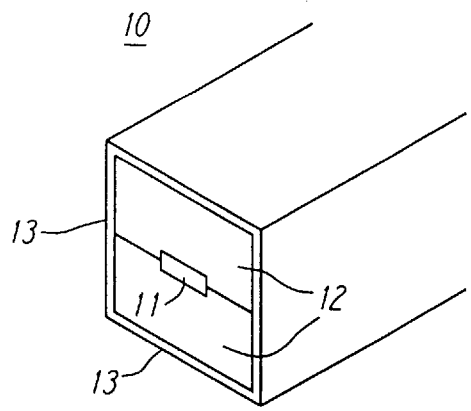
FIG. 12 is a perspective view of a stripline cryocable of the present invention.
Figure 13:
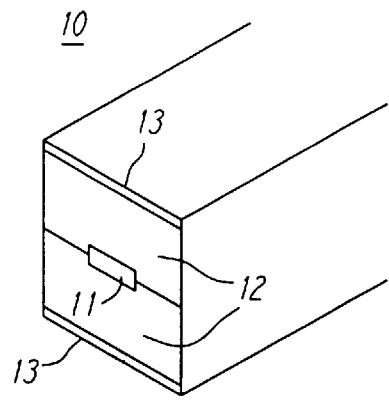
FIG. 13 is a perspective view of a second embodiment of a stripline cryocable of the present invention.

Embodiments of interconnects other than a coaxial cable geometry may be used to accomplish the present invention. Specifically, the cryocable 10 may be produced as a stripline (with or without side grounds) as shown in FIGS. 12 and 13 respectively. Such stripline cryocables 10, as are shown in FIGS. 12 and 13, would include a center conductor 11, a surrounding dielectric 12, and an outer conductor 13 which may completely surround the dielectric 12 as is shown in FIG. 12 or which may exist only on two sides of the dielectric 12 as is shown in FIG. 13.

Figure 14:
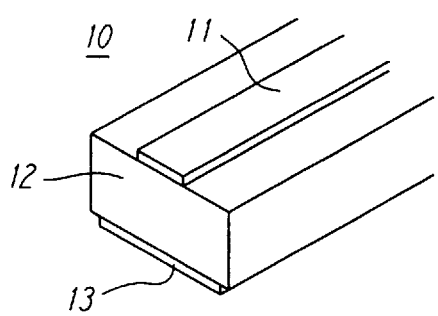
FIG. 14 is a perspective view of a microstrip cryocable of the present invention.
Figure 15:
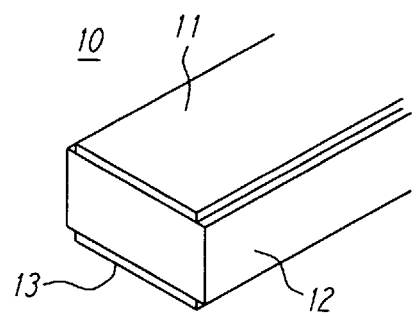
FIG. 15 is a perspective view of a balanced microstrip cryocable of the present invention.

In addition, the cryocable 10 may be produced in a microstrip configuration or a balanced microstrip configuration as is shown in FIGS. 14 and 15 respectively. Such microstrip cryocables 10, as are shown in FIGS. 14 and 15, would include a first conductor 11 which acts as a center conductor, a dielectric 12, and a second conductor 13 which acts as an outer conductor. The first conductor 11 of the microstrip cryocable 10 shown in FIG. 14 is smaller in size than that second conductor 13. As shown in FIG. 15, the first and second conductors 11 and 13 of the balanced microstrip cryocable 10 are of approximately the same size.

Figure 16:
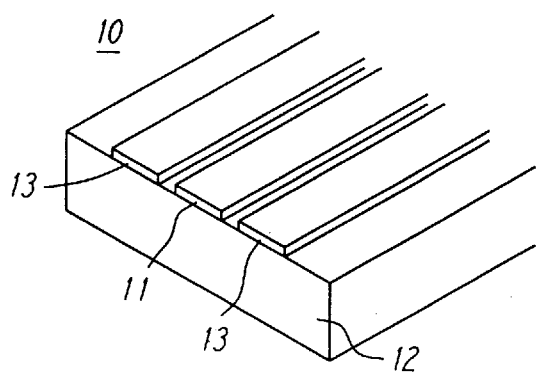
FIG. 16 is a perspective view of a coplanar waveguide cryocable of the present invention.
Figure 17:
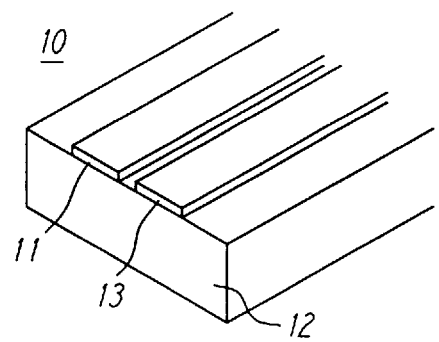
FIG. 17 is a perspective view of a coplanar slot line cryocable of the present invention.

Furthermore, the cryocable 10 may be produced in a coplanar waveguide or a coplanar slotline configuration as are shown in FIGS. 16 and 17 respectively. Such coplanar cryocables 10, as are shown in FIGS. 16 and 17, would include a first conductor 11 which acts as a center conductor, a dielectric 12, and a second conductor 13 which acts as an outer conductor. These cryocables 10 are coplanar because both conductors 11 and 13 are positioned on the same side of a planar dielectric 12, as is shown in FIGS. 16 and 17. The coplanar waveguide cryocable 10, as shown in FIG. 16, includes two second conductors 13 which are positioned on the dielectric 12 on either side of the first conductor 11. As shown in FIG. 17, the first and second conductors 11 and 13 of the coplanar slotline cryocable 10 are singular and lie next to each other on the dielectric 12.

The use of stripline, microstrip, or coplanar or slotline transmission lines instead of coaxial cables does not change the mode of operation of the cryogenic cables. The basic change is that the stripline interconnects, the microstrip interconnects, and the coplanar or slotline interconnects are rectangular (rather than round as for the coaxial case described above). This means that the stripline, the microstrip, or the coplanar or slotline realization can be manufactured from standard circuit patterning and etching of thin copper conductors on a dielectric substrate (for example, RT Duroid from Rogers Corporation, 100 S. Roosevelt Ave., Chandler, Az. 85226, U.S.A.).

While embodiments of the present invention have been shown and described, various modifications may be made without departing from the scope of the present invention, and all such modifications and equivalents are intended to be covered.

We claim:

1. An electrical interconnect for passing signals from cryogenic circuitry to ambient circuitry comprising a first electrical conductor, a dielectric adjacent to and operatively interfaced with the first electrical conductor, a second electrical conductor adjacent to and operatively interfaced with the dielectric, the second conductor having a thickness from about six microns to about twenty microns, the interconnect connectable between cryogenic circuitry and ambient circuitry, the cryogenic circuitry and the ambient circuitry having a temperature difference, the interconnect having a heat flux when connected between the cryogenic circuitry and the ambient circuitry wherein the heat flux is less than about one Watt when the temperature difference between the cryogenic circuitry and the ambient circuitry is at least about two hundred degrees Centigrade, and the interconnect having an insertion loss wherein the insertion loss is less than about one decibel.

2. An electrical interconnect for passing signals from cryogenic circuitry to ambient circuitry comprising a first electrical conductor, a dielectric adjacent to and operatively contacting the first electrical conductor, a second electrical conductor adjacent to and operatively contacting the dielectric, the second electrical conductor having a thickness from about 6 microns to about 20 microns, the interconnect operatively connectable between cryogenic circuitry and ambient circuitry, the cryogenic and ambient circuitry having a temperature difference, the interconnect having a heat flux when connected between the cryogenic circuitry and the ambient circuitry, the heat flux being less than about one-tenth of a Watt when the temperature difference between the cryogenic circuitry and the ambient circuitry is at least about two hundred degrees Celsius, the interconnect having an insertion loss, and the insertion loss being less than about one decibel.

3. An electrical interconnect for passing millimeter and microwave signals from cryogenic circuitry to ambient circuitry comprising a first electrical conductor, a dielectric adjacent to and operatively contacting the first electrical conductor, a second electrical conductor adjacent to and operatively contacting the dielectric and having a thickness from about 6 microns to about 20 microns, the interconnect characterized in that when the interconnect is operatively connected between cryogenic circuitry and ambient circuitry a heat flux flowing through the interconnect between the cryogenic circuitry and the ambient circuitry is less than about one-tenth of a Watt when a temperature difference occurs between the cryogenic circuitry and the ambient circuitry of at least about two hundred degrees Celsius, and the interconnect characterized further in that an insertion loss associated therewith is less than about one decibel.

4. The coaxial interconnect of claim 3 wherein the outer conductor comprises a plated conductor.

5. A coaxial interconnect for coupling electrical signals from a cryogenic environment to a non-cryogenic environment comprising a center conductor, a dielectric axially surrounding and operatively contacting the center conductor and having an outer surface, an outer conductor operatively contacting the outer surface of the dielectric and being less than about 20 microns thick.

6. The coaxial interconnect of claim 5 wherein the center conductor has a round cross-section.

7. The coaxial interconnect of claim 5 wherein the center conductor has a rectangular cross-section.

8. The coaxial interconnect of claim 5 wherein the dielectric has a round cross-section.

9. The coaxial interconnect of claim 5 wherein the dielectric has a rectangular cross-section.

10. The coaxial interconnect of claim 5 wherein the outer conductor completely surrounds the dielectric.

11. The coaxial interconnect of claim 5 wherein the outer conductor partially surrounds the dielectric.

12. The coaxial interconnect of claim 5 wherein the dielectric is comprised of Teflon™.

13. The coaxial interconnect of claim 5 wherein the dielectric is comprised of PEEK.

14. The coaxial interconnect of claim 5 wherein the outer conductor is comprised of copper.

15. The coaxial interconnect of claim 5 wherein the outer conductor comprises a plated conductor.

16. An electrical interconnect for passing millimeter and microwave signals from cryogenic circuitry to ambient circuitry comprising a first electrical conductor, a dielectric adjacent to and operatively interfaced with the first electrical conductor, a second electrical conductor adjacent to and operatively interfaced with the dielectric and having a thickness from about 6 microns to about 20 microns, the interconnect characterized in that when the interconnect is connected between the cryogenic circuitry and the ambient circuitry, a heat flux flowing through the interconnect between the cryogenic circuitry and the ambient circuitry is less than about one Watt when a temperature difference occurs between the cryogenic circuitry and the ambient circuitry of at least about two hundred degrees Celsius, and the interconnect characterized further in that an insertion loss associated therewith is less than about one decibel.

17. The interconnect of claim 16 wherein the interconnect is at least about five centimeters in length.

18. The interconnect of claim 16 wherein the interconnect has a cross-sectional width of less than about 0.10 inches from any one side surface of the interconnect to any other side surface of the interconnect farthest from the one side surface.

19. The interconnect of claim 16 wherein the interconnect has a cross-sectional width of less than about 0.040 inches from any one side surface of the interconnect to any other side surface of the interconnect farthest from the one side surface.

20. The interconnect of claim 16 further comprising a transition for coupling the interconnect to the cryogenic circuit, the transition comprising a center conductor having a first segment and a second segment, said center conductor electrically connected to one of said first electrical conductors and said second electrical conductors, a transition dielectric having a first region axially surrounding and operatively contacting the first segment of the center conductor, said transition dielectric having a second region partially axially surrounding the second segment of the center conductor to enable a section of the second segment of the center conductor to be exposed, the transition dielectric second region and the exposed portion of the second segment of the center conductor comprising a substantially flat surface, said transition dielectric first region having a first axial cross-sectional width from any one side surface of said first region to any other side surface of said first region farthest away from said one side surface of said first region, said transition dielectric second region having a second axial cross-sectional width from any one side surface of said second region to any other side surface of said second region farthest away from said one side surface of said second region wherein said second axial cross-sectional width is smaller than said first axial cross-sectional width, the transition dielectric also having an outer surface, an outer conductor operatively contacting an outer surface of the transition dielectric and electrically connected to the other of said first electrical conductor or said second electrical conductor, and means for operatively connecting said transition to the cryogenic circuitry.

21. The transition of claim 20 wherein the first segment of the center conductor is shielded by the transition dielectric and the second segment of the center conductor is shielded by the transition dielectric and air.

22. The interconnect of claim 20 further comprising:

a first portion corresponding to the first segment of the center conductor, the transition dielectric axially surrounding the first segment of the center conductor, and the outer conductor operatively contacting the transition dielectric axially surrounding the first segment of the center conductor, and a second portion corresponding to the second segment of the center conductor, the transition dielectric axially surrounding the second segment of the center conductor, and the outer conductor operatively contacting the transition dielectric axially surrounding the second segment of the center conductor, and the first and second portions have respective axial cross-sectional widths, wherein the axial cross-sectional width of the first portion from any one side surface of the first portion to any other side surface of the first portion farthest away from the one side surface of the first portion is larger than the axial cross-sectional width of the second portion from any one side surface of the second portion to any other side surface of the second portion farthest away from the one side surface of the second portion.

23. The transition of claim 20, wherein the outer conductor comprises a plated conductor.

24. The transition of claim 20 wherein the outer surface of the transition dielectric is curved.

25. The transition of claim 24 wherein the transition dielectric surrounding the first segment of the center conductor is substantially cylindrical.

26. The transition of claim 24 wherein the transition dielectric partially surrounding the second segment of the center conductor is substantially cylindrical.

27. The interconnect of claim 16 further comprising a transition for coupling the interconnect to the cryogenic circuit, the transition comprising a first portion and a second portion, a center conductor having a central axis, a first segment corresponding to the first portion, and a second segment corresponding to the second portion, a transition dielectric having a first region axially surrounding and operatively contacting the first segment of the center conductor, the transition dielectric first region having an outer surface, said transition dielectric further having a second region partially axially surrounding the second segment of the center conductor to enable a section of the second segment of the center conductor to be exposed, the transition dielectric second region having an outer surface, and the transition dielectric second region and the exposed portion of the second segment of the center conductor comprising a substantially flat surface, an outer conductor operatively contacting the outer surface of the transition dielectric first region and the outer surface of the transition dielectric second region, the outer conductor having an outer surface, and being electrically connected to one of said first electrical conductor and said second electrical conductor, said first portion having a thickness from a central axis of the first segment of the center conductor to the outer surface of the outer conductor contacting the transition dielectric first region, said second portion having a thickness from a central axis of the second segment of the center conductor to the outer surface of the outer conductor contacting the transition dielectric second region, wherein the thickness of the first portion is thicker than the thickness of the second portion, and means for operatively connecting said transition to the cryogenic circuitry.

28. The interconnect of claim 16 further comprising a transition for coupling the interconnect to the cryogenic circuit, the transition comprising a center conductor having a central axis, a first segment, and a second segment, said center conductor electrically connected to one of said first electrical conductor and said second electrical conductor, a transition dielectric having a first region axially surrounding and operatively contacting the first segment of the center conductor, said transition dielectric having a second region partially axially surrounding the second segment of the center conductor to enable a section of the second segment of the center conductor to be exposed, the transition dielectric second region and the exposed portion of the second segment of the center conductor comprising a substantially flat surface, said transition dielectric first region having an outer surface and a thickness from said central axis of the center conductor to the outer surface of the transition dielectric first region, said transition dielectric second region having an outer surface and a thickness from said central axis of the center conductor to the outer surface of the transition dielectric second region, wherein the thickness of the transition dielectric second region is thinner than the thickness of the dielectric first region, an outer conductor operatively contacting the outer surface of the transition dielectric first region and the outer surface of the transition dielectric second region, said outer conductor electrically connected to the other of said first electrical conductor and said second electrical conductor and means for operatively connecting said transition to the cryogenic circuitry.

* * * * *

UNITED STATES PATENT AND TRADEMARK OFFICE
CERTIFICATE OF CORRECTION

PATENT NO    :   5,856,768
DATED        :   January 5, 1999
INVENTOR(S)  :   Hey-Shipton et al.

It is certified that error appears in the above-identified patent and that said Letters Patent is hereby corrected as shown below:

In column 7, line 50, after "cryocables" delete "et" and insert therefor --get--.

Signed and Sealed this

Thirty-first Day of August, 1999

*Attest:*

Q. TODD DICKINSON

*Attesting Officer*      *Acting Commissioner of Patents and Trademarks*